B. D. PINKNEY.
COVER FOR MIXERS.
APPLICATION FILED SEPT. 1, 1920.

1,375,416.

Patented Apr. 19, 1921.

Inventor:
Bryant Pinkney.

UNITED STATES PATENT OFFICE.

BRYAN D. PINKNEY, OF NEWPORT, KENTUCKY.

COVER FOR MIXERS.

1,375,416.     Specification of Letters Patent.     Patented Apr. 19, 1921.

Application filed September 1, 1920. Serial No. 407,507.

*To all whom it may concern:*

Be it known that I, BRYAN D. PINKNEY, a citizen of the United States, residing at Newport, in the county of Campbell and State of Kentucky, have invented certain new and useful Improvements in Covers for Mixers, of which the following is a specification.

My invention relates to a cover for dough mixers and similar machines, such as disclosed in my pending application, Serial No. 372,450, filed April 9, 1920, wherein materials of a dusty nature are mixed; and, the object of my invention is to make a perfect "seal" or tight joint for the cover when the mixer is in the upright position, and allow a gradually increasing clearance as the mixer is tilted to its discharging position.

Figure 1:
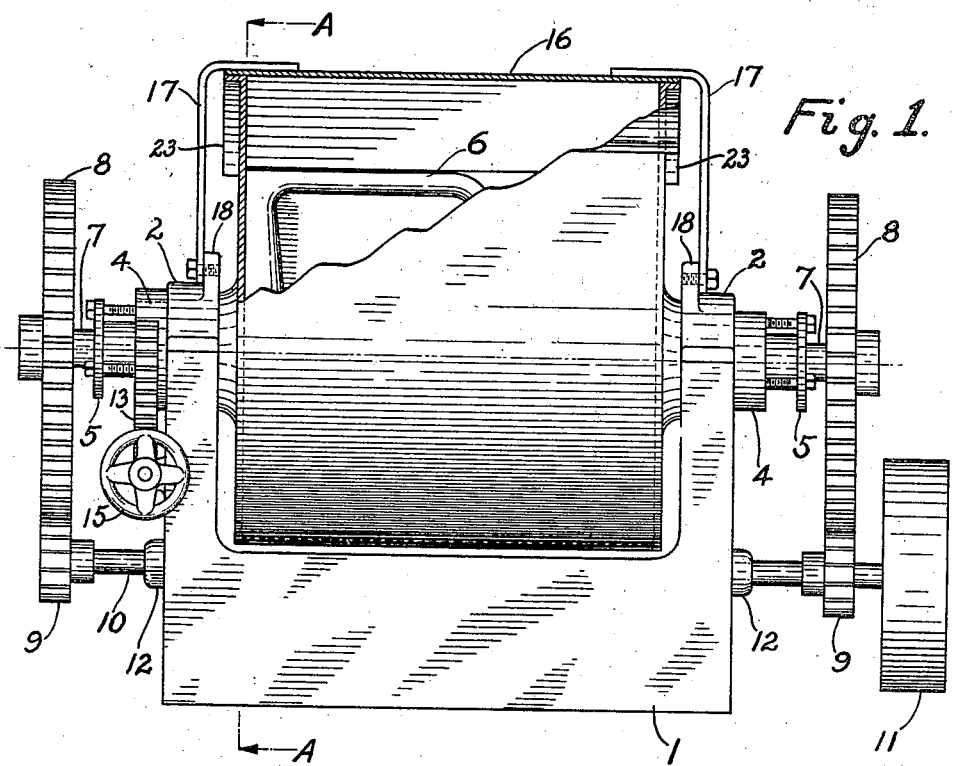
Figure 2:
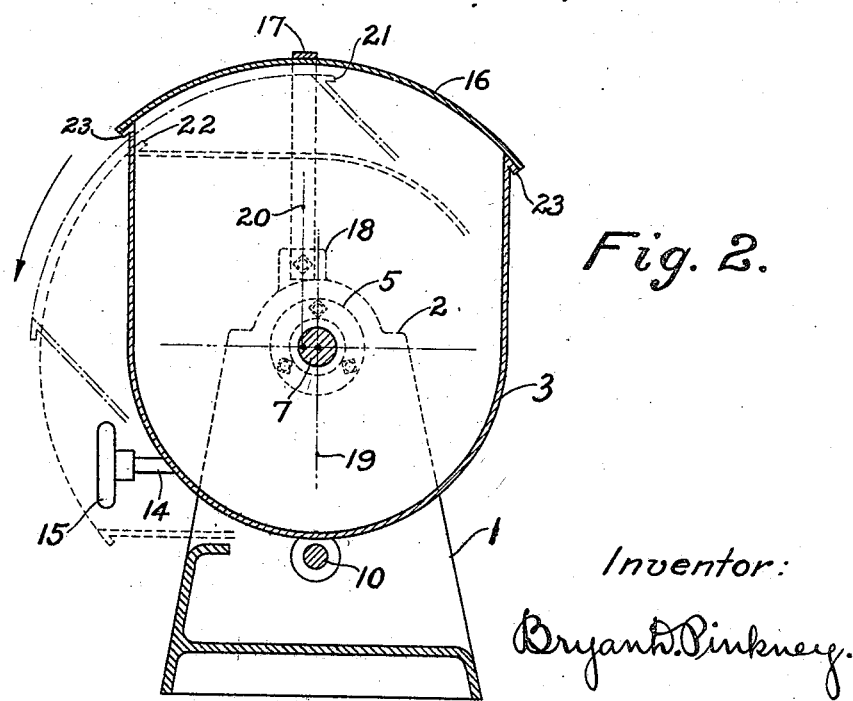

I attain this object by the mechanism illustrated in the accompanying drawing, in which Figure 1 is a front elevation, partially sectioned; Fig. 2, a cross section taken at line A—A, Fig. 1, and shows the mixing bowl in various tilted positions.

Similar numerals refer to similar parts throughout the several views.

Referring to the drawing, the frame 1 is is provided with caps 2 in which are pivoted the trunnions 4 of the mixing bowl 3. To prevent leakage I have provided suitable stuffing-boxes 5, such as disclosed in my Patent No. 1,248,397, dated Nov. 27, 1917. The mixing arm 6 is mounted on shafts 7 and driven by gears 8 which mesh with pinions 9. Said pinions 9 are fastened on a drive shaft 10 which is journaled in the frame 1.

Motive power is applied to the mixer by any suitable means, such as, for example, by the drive pulley 11. The collars 12 serve to drive shaft 10 in proper alinement.

A chordal wormwheel 13 is secured to one of the trunnions 4 for purposes of tilting the mixer. Said wormwheel 13 meshes with a worm on wormshaft 14 journaled in bearings on the frame 1. I have shown wormshaft 14 provided with a handwheel 15 for manually operating wormshaft 14, or said wormshaft may be operated by any other suitable means.

The cover 16 is supported from the caps 2 of the frame 1 by means of braces 17 fastened to projections 18 of the said caps, and said cover is independent of the mixing bowl 3. The braces 17 are located forward at a center line 20 ahead of the center line 19 of the mixing bowl, and the radius of said cover coincides with said center line 20. As the mixing bowl 3 starts to tilt on the axis of shafts 7 at center line 19, the flange 23 all around the top of mixing bowl 3 begins to clear the cover 16, as shown in positions 21 and 22, thus eliminating the friction experienced in all other types of covers for dough mixers known to applicant. The cover always remains in a stationary position above mixing bowl 3. Another feature is that the mixing bowl wedges the cover 16 when mixing bowl 3 is raised to its vertical position so that a very tight joint is effected, and leakage of flour and other forms of dust is entirely eliminated, resulting in great saving of material, and at the same time promotes sanitation.

Various changes may be made in the arrangement and details of my invention without departing from the spirit of my invention as set forth in the following claim.

Having thus described my invention, what I claim as new, and desire to secure by Letters Patent, is—

A cover for mixers comprising a stationary curved member, a supporting framework for said member, a bowl with a curved top edge adapted to be trunnioned in a frame and fitting beneath said curved member, and means to tilt said bowl; the radius center of said curved member being eccentric with the axis of said bowl so that a clearance space under the curved member results as said bowl is tilted forward.

In testimony whereof I affix my signature.

BRYAN D. PINKNEY.